United States Patent [19]

Kawate et al.

[11] Patent Number: 5,759,090

[45] Date of Patent: Jun. 2, 1998

[54] SANDING PAD CONTAINING A HEAT DISTORTABLE POLYMER AND SANDING PROCESS USING SAME

[75] Inventors: Kohichiro Kawate, Machida; Hitoshi Furutani, Zama; Sadao Yoshizaki, Sagamihara; Hiroshi Imai, Isehara, all of Japan

[73] Assignee: Minnesota Mining and Manufacturing Company, St. Paul, Minn.

[21] Appl. No.: 737,698

[22] PCT Filed: Apr. 21, 1995

[86] PCT No.: PCT/US95/04916

§ 371 Date: Nov. 20, 1996

§ 102(e) Date: Nov. 20, 1996

[87] PCT Pub. No.: WO95/32840

PCT Pub. Date: Dec. 7, 1995

[30] Foreign Application Priority Data

Jun. 1, 1994 [JP] Japan ................... 6-120151

[51] Int. Cl.$^6$ ................................. B24B 1/00
[52] U.S. Cl. ................. 451/56; 451/28; 451/523; 451/526
[58] Field of Search .............. 451/523, 526, 451/527, 528, 529, 530, 539, 538, 56, 28

[56] References Cited

U.S. PATENT DOCUMENTS

| | | | |
|---|---|---|---|
| 3,491,776 | 1/1970 | Fleming | 132/89 |
| 4,690,642 | 9/1987 | Kyotani | 433/142 |
| 4,945,127 | 7/1990 | Kagawa et al. | 524/524 |
| 5,057,252 | 10/1991 | Kagawa et al. | 264/22 |
| 5,189,110 | 2/1993 | Ikematu et al. | 525/314 |

FOREIGN PATENT DOCUMENTS

| | | |
|---|---|---|
| 2205468 | 8/1990 | Japan . |
| 4146039 | 5/1992 | Japan . |

Primary Examiner—Timothy V. Eley
Assistant Examiner—Derris H. Banks
Attorney, Agent, or Firm—Daniel C. Schulte

[57] ABSTRACT

A sanding pad (102, 204) comprising a plate-shaped substrate (104, 201) and an abrasive (103, 203) fixed by the use of a fixing means (102, 202) onto a major surface of the substrate (104, 201), and the substrate (104, 201) having a heat distortable polymer which has a dimension-retaining first state within a normal use temperature range of said pad (102, 204) and a deformable state at a temperature above said normal use temperature range. The invention provides an inexpensive sanding pad capable of sanding a three-dimensional curved surface, uniformly and easily, which is superior in repeated usability.

4 Claims, 1 Drawing Sheet

SANDING PAD CONTAINING A HEAT DISTORTABLE POLYMER AND SANDING PROCESS USING SAME

TECHNICAL FIELD

The present invention relates to a sanding pad suitable for sanding or grinding a coating, putty and the like. More particularly, the present invention relates to a sanding pad for sanding a curved surface.

BACKGROUND ART

In order to sand a surface of a workpiece having curved in three dimensions by a hand tool, a hard shaped tool or a flexible tool such as sponge has been used. Examples of the hard shaped tool include commercially-available products under the trademarks "Diapad™", "Stikit™" (manufactured by Sumitomo 3M, Tokyo Japan), "Q-File™" (manufactured by Kobax Co.), and the like. Examples of the flexible tool include non-woven abrasives such as known handheld sanding pads, commercially available under the trademark "Scotch Bright™" (manufactured by Sumitomo 3M), and the like.

However, in the instance of the hard shaped tool, it is difficult to repair or shape by sanding a three-dimensional curved surface because the hard surface of the tool tends to only form a point- or linear-contact between a curved surface of a workpiece and the tool during sanding, and thus uniform contact is not established along the contour of the curved surface. Further, in the flexible tool, which more favorably conforms to the contour of the three-dimensional curved surface, it is also difficult to repair or shape by sanding such a three-dimensional curved surface because an uniform pressure cannot be applied over the surface, which results in nonuniform sanding.

Japanese Laid-Open Patent Publication No. 1-153277 suggests a sanding tool comprising an abrasive provided on a substrate formed of a shape-memory alloy, as one proposal for imparting curvature to the sanding tool which better conforms to a curved surface of the workpiece. However, while such a tool is effective for sanding a curved surface having a relatively large radius of curvature, it is not suitable for a curved surface having a small radius of curvature or a complicated sectional shape. Because a deformation limit of the shape-memory alloy is 7%, it is therefore difficult to impose a large deformation thereon. Also, there is a problem that the cost of the sanding pad becomes high because the shape-memory alloy is expensive (e.g. priced at 100,000 Yen/kg).

DISCLOSURE OF THE INVENTION

The present invention solves the above problems while providing an inexpensive sanding pad capable of sanding a three-dimensional curved surface, uniformly and facilely.

In one embodiment of the present invention, there is a sanding pad comprising a plate-shaped substrate and an abrasive fixed by the use of a fixing means onto a main or major surface of the substrate, wherein the substrate is formed of a heat distortable polymer having a dimension-retaining first state within a normal use or first temperature range of use of the pad, and a deformable state at a second temperature greater in value relative to the aforesaid normal use or first temperature range. One of the advantages of the present invention is that the sanding pad, via the shaping of the heat distortable polymer of the substrate, can provide a heat deformed shaped conforming to a nonplanar surface of the workpiece desired to be sanded.

In a further embodiment, the heat distortable polymer used to form the substrate comprises a shape-memory resin. In an even further embodiment, the heat distortable polymer has a heat distortion temperature from between 30° to 150° C. In another embodiment, the heat distortable polymer contains a copolymer of urethane (meth)acrylate and (meth) acrylate as the main or preponderant (>50% by weight) constituent of the polymer.

In yet another further embodiment of the invention, the fixing means comprises either an adhesive material or a mechanical fastener.

Also, the present invention provides a process for sanding a three dimensional curved surface of a work piece, which comprises the steps of:

(a) heating the aforesaid sanding pad to a temperature above the heat distortion temperature of the heat distortable polymer;

(b) pressing the sanding pad onto a nonflat surface of a workpiece to be sanded to deform the heat distortable polymer into a shape conforming to the surface of the workpiece;

(c) cooling the deformed sanding pad below the heat distortion temperature of the heat distortable polymer to fix the shape; and (d) sanding the surface of the workpiece by using the resulting sanding pad. The above steps of the process of the invention preferably are conducted in the same sequence described above.

According to the present invention, there is thus provided an economical sanding pad capable of sanding a three-dimensional curved surface, uniformly and easily, which is superior in repeated usability.

BRIEF DESCRIPTION OF DRAWINGS

FIG. 3($b$) is a sectional view illustrating a brass cylindrical material filled with an epoxy adhesive after finish-repairing by using a sanding pad of the present invention.

BEST MODE FOR CARRYING OUT THE INVENTION

The plate-shaped substrate employed in the present invention in the inventive sanding pad is formed of a heat distortable polymer. The term "heat distortable polymer" means a material which has a fixed shape at a temperature below a heat distortion temperature thereof because of its high elastic modulus, and which becomes flexible at a temperature above the heat distortion temperature because of its low elastic modulus, which results in free deformation.

A plate-shaped heat distortable polymer of the sanding pad can be deformed along a shape of the workpiece surface to be sanded to conform to the contour thereto by pressing it onto the workpiece at a temperature above a heat distortion temperature of the polymer. Thereafter, when the polymer is cooled below its heat distortion temperature, a deformed shape that aptly conforms to the contour of the workpiece surface can be fixed or set for the subsequent sanding operation.

Figure 1:
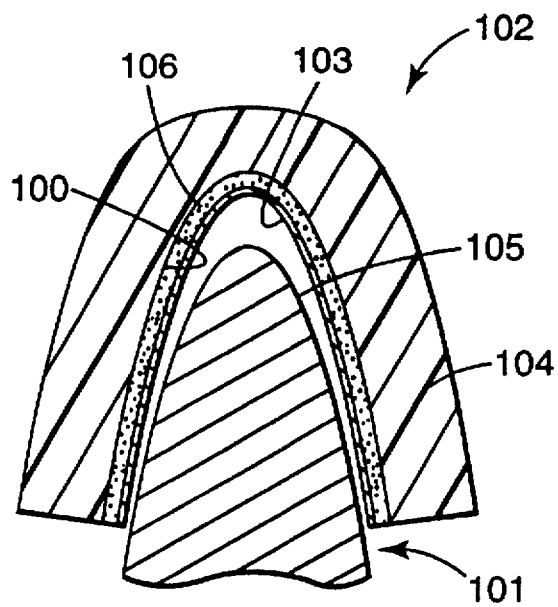
FIG. 1 is a sectional view illustrating a sanding pad of the present invention, which has been deformed along a curved surface of a workpiece to be sanded.

Accordingly, as shown in FIG. 1, when the plate-shaped polymer is used as a substrate 104 of a sanding pad, a deformed sanding pad 102 having a shape fitted to a three-dimensional curved surface 105 of a workpiece 101 to be sanded, can be provided by a straightforward procedure of this invention. In FIG. 1, component 104 is the substrate layer having a major surface 100; component 106 is the fixing means disposed on major surface 100 of the substrate 104; and component 103 is the abrasive (e.g., an abrasive sheet, such as sandpaper) fixed to the substrate 104. For purposes of illustration and clarity only, FIG. 1 shows the sanding pad 102 as slightly disengaged from the workpiece. During sanding, the workpiece and sanding pad would be conformably placed together. In particular, during sanding, the abrasive 103 will be the component of the sanding pad 102 which most closely conforms to the confronted contour of the surface 105 of the workpiece 100.

For example, it becomes possible to sand the three-dimensional curved surface, uniformly and easily, using the sanding pad of the present invention according to the following procedure.

Firstly, a sanding pad comprising a substrate of a plate-shaped heat distortable polymer and an abrasive fixed on a main surface of the substrate is heated above a heat distortion temperature of the heat distortable polymer. Then, the heated sanding pad is pressed onto a three-dimensional curved surface to be sanded to deform it along a shape of the surface. The deformed sanding pad is cooled below the heat distortion temperature to fix the shape. Then, the surface is sanded using the sanding pad thus obtained. The sanding pad of the present invention may be deformed along a shape of the surface to be sanded by heating concurrent to pressing it onto the surface.

It is preferred that the heat distortable polymer used as the plate-shaped substrate of the sanding pad of the present invention has a heat distortion temperature of about 30° to 150° C., particularly 40° to 100° C., more particularly 40° to 70° C. When the heat distortion temperature is lower than 30° C., the substrate is inadvertently softened due to room temperature or heat generated during sanding procedure and, therefore, the shape of the sanding pad form-fitted to the surface to be sanded cannot be maintained. On the other hand, when the heat distortion temperature is higher than 150° C., the deforming procedure may become troublesome and heat deterioration of a workpiece to be sanded may inadvertently occur.

When the heat distortion temperature is 40° to 100° C. of the substrate polymer, it becomes possible to conduct heat distortion using a simple heating means such as hot air-blowing dryer, hot water, and the like. Furthermore, when the heat distortion temperature is 40° to 70° C., it becomes possible to conduct heat distortion in more short time. The heat distortion temperature of the heat distortable polymer is defined by the procedure according to ASTM-D1637 or D648.

A size of the substrate used in the present invention varies depending on the size of sanding pad to be prepared, and it is not specifically limited. It is preferred that the size of the substrate is within the range between 20×20 mm and 2000× 2000 mm due to convenience in handling. A thickness of the substrate may be varied depending on the polymeric material employed as the substrate, and is not particularly limited on the condition that the substrate being provided with hardness enough to maintain its heat deformed shape throughout the sanding procedure. The substrate having a thickness of from 0.5 to 10 mm is generally employed.

As the heat distortable polymer which is preferably used in the present invention, for example, there are polyvinyl t-butyl ether, polystyrene, porymethylstyrene, polyphenylstyrene, polychlorostyrene, poly-2,5-dichlorostyrene, polymethyl methacrylate, polyethyl methacrylate, poly-t-butyl acrylate, polycyclohexyl methacrylate, poly-n-propyl methacrylate, polyvinyl chloride, poly-1,2-dichloroethylene, polyacrylonitrile, polymethacrylonitrile, polyvinyl formal, polyvinyl butyral, ethyl cellulose, polyethylene terephthalate, polytetramethylene terephthalate, nylon 6, nylon 10, nylon 12, nylon 6,6, nylon 6,10, polyisoprene, polycaprolactone, poly-1-pentene, polyethylene oxide, polychloroprene and the like.

When a shape-memory resin is used as the heat distortable polymer, not only the shape of the surface to be sanded can be conformed to like a typical thermoplastic polymer, but also the resulting shape of the sanding pad substrate can be taken out and the shape thereof returned to its original shape (e.g. plate-shape) by reheating and reshaping same after use, thereby, a more versatile and effective sanding tool can be obtained.

The term "shape-memory resin" refers to a resin capable of crosslinking to provide a polymeric material which acts as a shape-memory material. Examples of the shape-memory resin include polynorbornene (Japan Laid-Open Patent Publ. No. 59-53528), styrene-butadiene copolymer (Japan Laid-Open Patent Publ. No. 63-179955), polyurethane (Japan Laid-Open Patent Publ. No. 61-293214), polyisoprene (Japan Laid-Open Patent Publ. No. 62-192440). For example, "Zeon-Shable™" (made by Nippon Zeon Co., Ltd.) is commercially available. A radiation curable shape-memory resin (Japan Laid Open Patent Publ. No. 4-100831) may also be used, and is particularly useful because of its excellent solvent resistance and simple manufacturing process.

The term "radiation curable shape-memory resin" refers to a resin capable of crosslinking upon radiation to provide a polymeric material which acts as a shape-memory material. As the particularly useful radiation curable shape-memory resin used in this invention, e.g., there is a copolymer of urethane (meth)acrylate and (meth)acrylate. By using this copolymer, the heat distortion temperature can be easily set within a wide range by changing a polymerization ratio and a kind of acrylate.

The urethane (meth)acrylate and (meth)acrylate may be copolymerized in an weight ratio of from 5/95 to 95/5. It is preferred that the resulting copolymer has a gel fraction of more than 90% and a crosslinking density of from $1\times10^{-5}$ to $1\times10^{-2}$ mol/g in order to attain mechanical strength and solvent resistance required for the substrate of the present sanding pad. A process of curing this copolymer using a radiation is known to those skilled in the art, for example, it is described in Japanese Laid-Open Patent Publication No. 4-100831.

The wording "urethane (meth)acrylate" means a compound obtained by introducing a (meth)acryloyl group into an oligomer having a hydroxyl group such as polyester and polycaprolactone through the medium of isocyanates. Examples of the urethane (meth)acrylate include those commercially available such as "KAYARAD UX4101™" (manufactured by Nippon Kayaku Co., Ltd.), "SIKO UV3000B™" (manufactured by Nippon Gosei Kagaku Co., Ltd.), "UNIDIC V4221™" (manufactured by Dainippon Inki Kagaku Co., Ltd.), "UNIDIC V4350™", and the like.

Examples of the (meth)acrylate include t-butyl (meth) acrylate, isobornyl (meth)acrylate, dicyclopentadienyl (meth)acrylate, cyclohexyl (meth)acrylate and the like. Among them, the (meth)acrylate which provides a homopolymer having Tg of not less than 30° C. is particularly useful. By using such a (meth)acrylate, it becomes easy to control a heat distortion temperature of the shape-memory resin obtained from copolymerizing urethane (meth)acrylate with (meth)acrylate.

The shape-memory resin employed in the present invention may be prepared by radiating or heating a mixture of the urethane (meth)acrylate and the (meth)acrylate in the presence of radical generating agent as described in detail in Japanese Laid-Open Patent Publication No. H4-100831.

As the abrasive, for example, there can be used known sanding disc, sandpaper, water-resistant paper, compound and the like. Normally, these abrasives consist of an abrasive grain, an adhesive and a backing material.

Examples of the abrasive grain include flint, garnet, emery, aluminum oxide, silicon carbide and the like. Examples of the adhesive include glue and synthetic adhesive. Examples of the backing material include paper, cloth, fiber and a combination thereof. A polymer film and a metal foil which are effective for grinding a putty are also included in the abrasive used in the present invention.

For example, the abrasive grain and the adhesive is mixed by using mixer to obtain a mixture thereof. The resulting mixture is then applied onto a surface of backing by using drop and/or electrostatic coating procedure to obtain the abrasive which may be employed in the present invention.

Figure 2:
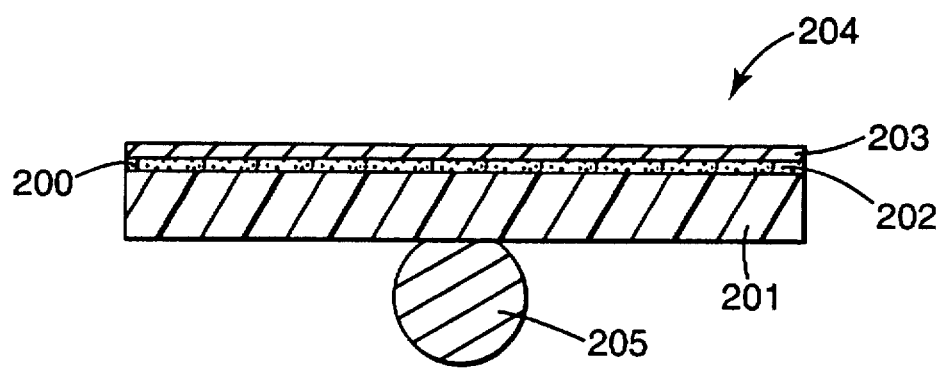
FIG. 2 is a sectional view illustrating one embodiment of a sanding pad of the present invention.

One embodiment of the present invention is shown in FIG. 2. An abrasive 203 (such as a conventional sandpaper sheet) is fixed on a main (major) surface 200 of a substrate 201 using a fixing means 202 to obtain a sanding pad 204 of the present invention. In the sanding pad of the present invention, a grasping handle 205 can be mounted on the opposite surface of the abrasive fixed on the substrate for convenience in handling. Further, a heater (not shown) can also be embedded in or laminated on the substrate, and self-powered by battery source (not shown), and the like, to heat the substrate without requiring an outside power source.

The fixing means may be any adhesive material or mechanical fastening device which can integrally maintain the substrate and the abrasive linked together throughout a sanding procedure. For example, the abrasive can be fixed on the substrate using a mechanical fastener or a pressure sensitive adhesive according to known methods and materials to those skilled in the art.

The mechanical fastener means an fixing means relying on a mechanical engaging effect, and examples thereof include those disclosed in Japanese Laid-Open Patent Publication Nos. 55-141203, 55-102377, 62-38105 and 3-191903. For example, there can be used a product which is well known as a "Magic Fastener™". The "Magic Fasteners™" comprises a A-face having J-shaped or mushroom-shaped hooks and a B-face having raising loops, to provide a hook and loop interlocking means. The "Magic Fasteners™" is effective for fixing the abrasive to the substrate removably, and it withstands a repeated removing. Thus, it is suitable for uses in which frequent replacement of the abrasive is required.

In this case, it is desired that the A-face of the Majic Fastener™ is provided on the surface of the substrate and the B-face of the "Magic Fastener™" is provided on the back surface of the abrasive. It is easy and inexpensive to provide the raising loops in comparison with the mushroom-shaped hooks and, therefore, it is relatively economical even if the B-face is thrown away along with the deteriorated abrasive. However, the B-face and A-face may be provided on the polymer substrate and the back surface of the abrasive, respectively. As a process for providing the A-face or B-face of the "Magic Fastener™" on the surface of the substrate. e.g., there can be used a process of adhering same with an adhesive, or a process of shaping the surface of the substrate to provide various hooks shapes directly in the surface thereof using a mold.

In the case that the replacement frequency of the abrasive is relatively low, the abrasive may be directly adhered to the substrate using the pressure sensitive adhesive. The term "pressure sensitive adhesive" used herein means an adhesive which can adhere to an object by applying a pressure and can be removed without leaving any adhesive residue. The pressure sensitive adhesive may be any pressure sensitive adhesive which can withstand the heat distortion temperature of the substrate, and examples thereof include known adhesives such as rubber based adhesive, acrylic adhesive, polyether adhesive and the like.

These adhesives can be used by coating on the back surface of the abrasive or the surface of the substrate. Otherwise, it can be used as a double-faced adhesive tape.

The present invention will now be illustrated in greater detail by the following non-limiting examples and comparative examples in which all percentages are by weight, unless indicated otherwise.

EXAMPLES

Example 1

Figure 3A:
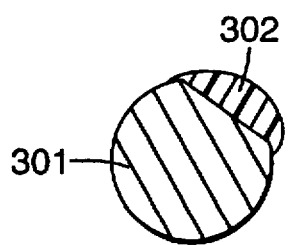
FIG. 3($a$) is a sectional view illustrating a brass cylindrical material filled with an epoxy adhesive prior to finish-repairing by using a sanding pad of the present invention.

The surface of a brass rod of 20.0 mm in diameter was ground (1.9 mm in depth) using a grinder, and an epoxy adhesive ("Araldide™", manufactured by Nichiban Co., Ltd.) was coated on the ground part. A sectional view illustrating a rod material before finish-repairing, wherein the ground brass rod 301 is filled with an epoxy resin adhesive 302 is shown in FIG. 3(a). Then a fixing means (c) shown in Table 1 was provided on a substrate (a), and an abrasive (b) was mounted on the fixing means to prepare three kinds of sanding pads.

TABLE 1

| Sanding pad No. (H.D. Temp.*) | Combinations of substrate (a), abrasive (b) and fixing means (c) |
|---|---|
| 1 (35° C.) | (a) "Nosorex ™¹) (b) "Excel Paper ™"²) (c) "Magic Cloth ™" soft type, A-face³) |
| 2 (80° C.) | (a) UX4101/CHMA/D1173 = 20/80/0.5⁴) (b) "Excel Paper ™" (c) "Magic Cloth ™" soft type, A-face |
| 3 (45° C.) | (a) UX4101/tBA/D1173 = 20/80/0.5⁵) (b) "Excel Paper ™" (c) "Magic Cloth ™" soft type, A-face |

* Heat distortion temperature.
¹) Shape-memory resin, manufactured by Nippon Zeon Co., Ltd.
²) Sandpaper with loops, manufactured by Sumitomo 3M Co., Ltd.
³) Mechanical fastener, manufactured by Kanebo Veltouch Co., Ltd.
⁴) Radiation curable memory-shape resin "UX4101 ™": Urethane acrylate, manufactured by Nippon Kayaku Co., Ltd.
CHMA: Cyclohexyl methacrylate
"D1173 ™": Photoradical initiator, manufactured by Ciba-Geigy Co., Ltd.
⁵) Radiation curable shape-memory resin
tBA: t-Butyl acrylate The substrate was softened by heating at 80° C. for 10 minutes in an oven, and then cooled to room temperature with pressing the surface to be sanded on the brass rod to deform the resulting sanding pad.

Figure 3B:
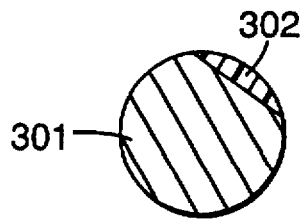

The brass rod was subjected to a finish-repairing by hand sanding using the deformed sanding pad. The diameter of the brass rod was repaired in an accuracy of 1% or less. A sectional view of the finish-repaired rod material is shown in FIG. 3(b).

Example 2

According to the same manner as that described in Example 1, a brass rod coarsely repaired with "Araldide™" was obtained.

Then, an abrasive with adhesive (b) shown in Table 2 was laminated on a substrate (a) to prepare two kinds of sanding pad.

TABLE 2

| Sanding pad No. (H.D. Temp.*) | Combinations of substrate (a) and abrasive with adhesive (b) |
| --- | --- |
| 4 (35° C.) | (a) "Nosorex ™" <br> (b) "Excel Paper ™" with adhesive[6] |
| 5 (60° C.) | (a) "Angren M-7000 ™"[7] <br> (b) "Excel Paper ™" with adhesive |

* Heat distortion temperature.
[6] Sandpaper with adhesive, manufactured by Sumitomo 3M Co., Ltd.
[7] Thermoplastic polymer, manufactured by Daicel Hulus, Co., Ltd.

The substrate was softened by heating at 80° C. for 10 minutes in an oven, and then cooled to room temperature with pressing the surface to be sanded on the brass rod to deform the resulting sanding pad.

The brass rod was subjected to a finish-repairing by hand sanding using the deformed sanding pad. The diameter of the brass rod was repaired in an accuracy of 1% or less. Among the sanding pads described in Examples 1 and 2, the sanding pad wherein the shape-memory resin is used as the substrate is particularly superior in repeated usability in comparison with the normal sanding pad wherein the thermoplastic resin is used as the substrate, and it could be used 100 or more times.

Comparative Example

According to the same manner as that described in Example 1 except that a "NT™" alloy (shape-memory alloy having a thickness of 1 mm and a heat distortion temperature of about 60° C.) manufactured by Furukawa Denki Kogyo Co., Ltd is used as the substrate, "Excel Paper™" with adhesive is used as the abrasive and a pressure sensitive adhesive is used as the fixing means, a sanding pad is prepared, and the resulting sanding pad was deformed. However, the sanding pad could not be deformed along a shape of the brass rod.

Example 3

In this Example, the repair (e.g. application of putty, coarse grinding and abrading) of a concave surface part of a front fender of an automobile ("Mirage™", manufactured by Mitsubishi Auto. Co., Ltd.) will be explained.

A trial of using a hard shaped tool ("Staykid Handblock 5440™", manufactured by Sumitomo 3M Co., Ltd.) was made by first, however, a concave surface could not be sanded because the tool could not fit and conform to the concave surface.

Then, a fixing means (c) shown in Table 3 was provided on a substrate (a), and an abrasive (b) was mounted on the fixing means to prepare a sanding pad. The resulting sanding pad could be repaired easily by deforming along a concave surface.

TABLE 3

| Sanding pad No. (H.D. Temp.*) | Combination of substrate (a), abrasive (b) and fixing means (c) |
| --- | --- |
| 6 (55° C.) | (a) UX8101[8]/tBA/D1173 = 50/50/1 (155 × 75 × 5 mm in size) <br> (b) "Excel Paper ™" <br> (c) "Magic Cloth ™" soft type, A-face. |

*Heat distortion temperature.
[8] Urethane acrylate, manufactured by Nippon Kayaku Co., Ltd.

This sanding pad is also superior in solvent resistance, and it could be washed with acetone, methanol, methyl ethyl ketone and the like. Further, it is also superior in repeated usability, and it was not deteriorated after usages of 100 times or more.

We claim:

1. A process for sanding a nonplanar surface of a workpiece where said surface has a shape curved in three-dimensions, comprising the steps of:
   (a) providing a sanding pad (102, 204) comprising a plate-shaped substrate (104, 201) including a major surface, an abrasive (103, 203) attached onto said major surface of said substrate (104, 201) by a fixing means (102, 202), said substrate (104, 201) comprising a heat distortable polymer, wherein said heat distortable polymer contains a copolymer of urethane methacrylate and methacrylate as preponderant constituent;
   (b) heating said sanding pad to a temperature exceeding the heat distortion temperature of said heat distortable polymer;
   (c) pressing said sanding pad (102, 204) onto said curved surface to be sanded to deform said pad (102, 204) to conform said abrasive (103, 203) of sanding pad (102, 204) to said shape of said curved surface;
   (d) cooling said deformed sanding pad (102, 204) below said heat distortion temperature to fix said deformed shape; and
   (e) sanding said curved surface by using the resulting deformed sanding pad of step (d).

2. The process of claim 1, wherein said heat distortable polymer comprises a polymer chosen from the group consisting of polyvinyl t-butyl ether, polystyrene, polymethylstyrene, polyphenylstyrene, polychlorostyrene, poly-2,5-dichlorostyrene, polymethyl methacrylate, polyethyl methacrylate, poly-t-butyl acrylate, polycyclohexyl methacrylate, poly-n-propyl methacrylate, polyvinyl chloride, poly-1,2-dichloroethylene, polyacrylonitrile, polymethacrylonitrile, polyvinyl formal, polyvinyl butyral, ethyl cellulose, polyethylene terephthalate, polytetramethylene terephthalate, nylon 6, nylon 10, nylon 12, nylon 6,6, nylon 6,10, polyisoprene, polycaprolactone, poly-1-pentene, polyethylene oxide, and polychloroprene.

3. A sanding pad (102, 204) comprising a plate-shaped substrate (104, 201) including a major surface, an abrasive (103, 203) attached onto said major surface (100, 200) of said substrate (104, 201) by a fixing means (102, 202), said substrate (104, 201) comprising a heat distortable polymer having a dimension-retaining first state within a first use temperature range of said pad (204) and a deformable state at a second temperature greater than said first use temperature range, wherein said heat distortable polymer contains a copolymer of urethane methacrylate and methacrylate as preponderant constituent.

4. The sanding pad of claim 1, wherein said heat distortable polymer comprises a polymer chosen from the group consisting of polyvinyl t-butyl ether, polystyrene, polymethylstyrene, polyphenylstyrene, polychlorostyrene, poly-2,5-dichlorostyrene, polymethyl methacrylate, polyethyl methacrylate, poly-t-butyl acrylate, polycyclohexyl methacrylate, poly-n-propyl methacrylate, polyvinyl chloride, poly-1,2-dichloroethylene, polyacrylonitrile, polymethacrylonitrile, polyvinyl formal, polyvinyl butyral, ethyl cellulose, polyethylene terephthalate, polytetramethylene terephthalate, nylon 6, nylon 10, nylon 12, nylon 6,6, nylon 6,10, polyisoprene, polycaprolactone, poly-1-pentene, polyethylene oxide, and polychloroprene.

* * * * *